United States Patent
Irie et al.

(10) Patent No.: US 12,315,955 B2
(45) Date of Patent: May 27, 2025

(54) SECONDARY CELL MODULE

(71) Applicant: Vehicle Energy Japan Inc., Hitachinaka (JP)

(72) Inventors: Akira Irie, Hitachinaka (JP); Sadayuki Aoki, Hitachinaka (JP); Kazunori Ojima, Hitachinaka (JP); Osamu Kubota, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 565 days.

(21) Appl. No.: 17/678,740

(22) Filed: Feb. 23, 2022

(65) Prior Publication Data

US 2022/0181748 A1    Jun. 9, 2022

Related U.S. Application Data

(63) Continuation of application No. PCT/JP2020/034643, filed on Sep. 14, 2020.

(30) Foreign Application Priority Data

Sep. 12, 2019   (JP) .................................. 2019-166019

(51) Int. Cl.
  *H01M 50/503*   (2021.01)
  *H01M 10/48*    (2006.01)
  (Continued)

(52) U.S. Cl.
  CPC ....... *H01M 50/503* (2021.01); *H01M 10/482* (2013.01); *H01M 50/209* (2021.01);
  (Continued)

(58) Field of Classification Search
  None
  See application file for complete search history.

(56) References Cited

U.S. PATENT DOCUMENTS

| 4,832,629 A * | 5/1989 | Sasaki ................... H01R 11/01 439/792 |
| 9,960,401 B2 | 5/2018 | Takase et al. |

(Continued)

FOREIGN PATENT DOCUMENTS

| CN | 105280851 B | 2/2018 |
| CN | 107851767 A | 3/2018 |

(Continued)

OTHER PUBLICATIONS

Machine English translation of JP2018063888A from Espacenet originally published to Sakate Apr. 19, 2018 (Year: 2018).*

(Continued)

*Primary Examiner* — Ula C Ruddock
*Assistant Examiner* — Mary Grace Byram
(74) *Attorney, Agent, or Firm* — Crowell & Moring LLP

(57) ABSTRACT

This secondary cell module has: a plurality of unit cells, each having a pair of positive and negative electrode terminals; a first bus bar providing an electrical connection between unit cells; and a second bus bar disposed on at least two unit cells of the plurality of unit cells and electrically connected to an external terminal. In addition, the present invention is characterized in that the second bus bar has a first metal member connected to the positive or negative electrode terminal, a second metal member connected to the external terminal, a third metal member connected to a voltage detection terminal, a first linkage member connecting the first metal member to the second metal member, and a second linkage member connecting the first metal member to the third metal member, and the first linkage member and the second linkage member are connected to each other via the first metal member.

9 Claims, 9 Drawing Sheets

(51) Int. Cl.
*H01M 50/209* (2021.01)
*H01M 50/296* (2021.01)
*H01M 50/50* (2021.01)
*H01M 50/51* (2021.01)
*H01M 50/522* (2021.01)
*H01M 50/569* (2021.01)
*H01M 50/289* (2021.01)
*H01M 50/517* (2021.01)

(52) U.S. Cl.
CPC ......... *H01M 50/296* (2021.01); *H01M 50/50* (2021.01); *H01M 50/51* (2021.01); *H01M 50/522* (2021.01); *H01M 50/569* (2021.01); *H01M 50/289* (2021.01); *H01M 50/517* (2021.01)

(56) References Cited

U.S. PATENT DOCUMENTS

| | | | |
|---|---|---|---|
| 2010/0055994 | A1 | 3/2010 | Mizutani |
| 2010/0190050 | A1 | 7/2010 | Ochi |
| 2011/0293992 | A1* | 12/2011 | Hsu ............... H01M 50/51 429/152 |
| 2013/0010449 | A1* | 1/2013 | Ikeda ............. B60L 50/64 361/826 |
| 2014/0212731 | A1* | 7/2014 | Lim ................ H01M 50/264 429/151 |
| 2014/0227581 | A1 | 8/2014 | Ohta |
| 2016/0372736 | A1 | 12/2016 | Kim et al. |
| 2017/0040586 | A1* | 2/2017 | Shimizu ............ H01G 4/228 |
| 2018/0151862 | A1 | 5/2018 | Bessho et al. |
| 2019/0221818 | A1 | 7/2019 | Matsumura et al. |

FOREIGN PATENT DOCUMENTS

| | | | |
|---|---|---|---|
| JP | 2004-297021 A | | 10/2004 |
| JP | 2010-62096 A | | 3/2010 |
| JP | 2010-176997 A | | 8/2010 |
| JP | 2012-186008 A | | 9/2012 |
| JP | 2013196932 A | * | 9/2013 |
| JP | 2015-82406 A | | 4/2015 |
| JP | 2018-63888 A | | 4/2018 |
| JP | 2018-170098 A | | 11/2018 |
| WO | WO 2013/030869 A1 | | 3/2013 |
| WO | WO 2017/017915 A1 | | 2/2017 |
| WO | WO 2018/061829 A1 | | 4/2018 |

OTHER PUBLICATIONS

Jash, 5 Easy Ways To Strengthen Sheet Metal, Jash Metrology, Jan. 3, 2018 (Year: 2018).*
Machine English translation of JP2013196932A originally published to Sakate Sep. 30, 2013 (Year: 2013).*
Chinese-language Office Action issued in Chinese Application No. 202080048344.3 dated Feb. 24, 2024 (12 pages).
C1 European Search Report issued in European Application No. 20862651.5 dated Aug. 30, 2023 (16 pages).
Extended European Search Report issued in European Application No. 20862651.5 dated Dec. 13, 2023 (19 pages).
Pini, V., et al., "How Two-dimensional Bending Can Extraordinarily Stiffen thin Sheets", Scientific Reports, Jul. 11, 2016, pp. 1-6, vol. 6, No. 1, XP055535324 (6 pages).
Chinese-language Office Action issued in Chinese Application No. 202080048344.3 dated Jun. 20, 2023 (9 pages).
International Search Report (PCT/ISA/210) issued in PCT Application No. PCT/JP2020/034643 dated Dec. 1, 2020 with English translation (four (4) pages).
Japanese-language Written Opinion (PCT/ISA/237) issued in PCT Application No. PCT/JP2020/034643 dated Dec. 1, 2020 with English translation (seven (7) pages).
Japanese-language Written Opinion (PCT/IPEA/408) issued in PCT Application No. PCT/JP2020/034643 dated Sep. 21, 2021 with English translation (nine (9) pages.
Chinese-language Office Action issued in Chinese Application No. 202080048344.3 dated Jun. 26, 2024 (5 pages).
Chinese-language Office Action issued in Chinese Appiication No. 202080048344.3 dated Aug. 30, 2024 (6 pages).

* cited by examiner

SECONDARY CELL MODULE

The present application is a continuation application of International Application No. PCT/JP2020/034643, filed on Sep. 14, 2020, which claims priority to Japanese Patent Application No. 2019-166019, filed Sep. 12, 2019. The contents of these applications are incorporated herein by reference in their entirety.

BACKGROUND OF THE INVENTION

(1) Field of the Invention

The present invention relates to a secondary cell module in which a plurality of secondary unit cells are connected to each other.

(2) Description of the Related Art

A secondary cell module, in which a plurality of secondary unit cells (herein after unit cells) are connected to each other, is constituted by mutually electrically connecting electrodes of the unit cells with an electrode component (herein after cell to cell bus bar).

In addition, the secondary cell module has a module external terminal bus bar (herein after external terminal bus bar) at its both ends to input and output power with other secondary cell modules or with external entities (other connecting entities).

The secondary cell module includes an insulating portion (herein after insulation cover) which insulates power current portions as cell to cell bus bars or terminals of the unit cell.

WO 2017-017915 (patent document 1) discloses such back ground technologies.

Patent document 1 discloses that: the power supply device is provided with a plurality of battery cells, which are provided with positive and negative electrode terminals, and a bus bar, which electrically connects the opposing electrode terminals of battery cells to each other, from among the plurality of battery cells that are disposed adjacent to each other (see abstract of patent document 1).

Patent document 1 further discloses: the bus bar is provided with a first linkage portion that is connected to one electrode terminal; a second linkage portion that is connected to the other electrode terminal: a first raised portion that is linked to the first linkage portion via a first bending portion; a second raised portion that is linked to the second linkage portion via a second bending portion and is disposed in an orientation that intersects with the first raised portion; and intermediate linking portion that is linked to the first raised portion via a third bending portion, which faces the first bending portion, and is linked to the second raised portion via a fourth bending portion, which faces the second bending portion (see abstract of patent document 1).

PRIOR TECHNICAL DOCUMENT

Patent Document

Patent document 1: WO 2017-017915

SUMMARY OF THE INVENTION

As described above, patent document 1 discloses a power supply device (a secondary cell module) having a cell to cell bus bar; the cell to cell bus bar has a connection portion (a unit cell connecting portion) that is connected to the electrode terminal and a connecting portion (a voltage detecting terminal connecting portion) for detecting a voltage.

Patent document 1, however, does not disclose an external terminal bus bar. Patent document 1, in particular, does not disclose a problem that: the stress, which is generated by torque when the external terminal for a module (herein after external terminal) is connected to the external terminal connection portion of the external terminal bus bar, is transmitted to the voltage detection terminal connection portion.

That is to say, patent document 1 does not disclose a structure of a secondary cell module in which a transmission of the stress, generated by a torque when the external terminal is connected to the external terminal connection portion, to the voltage detection terminal is suppressed.

Generally, a secondary cell module, which is installed in a car or the like, has an external terminal to be connected with bolts and the like to the car and the like.

The external terminal bus bar has an external terminal connection portion, a unit cell connection portion and a voltage detection terminal connection portion; the external terminal connection portion is connected to an external terminal with a bolt and the like. Consequently, a stress is generated at the external terminal connection portion by a torque when the connection is made. There is a concern that the stress is transmitted to the voltage detection terminal connection portion.

That is to say, a stress, which is transmitted from the external terminal connection portion to the voltage detection terminal connection portion, becomes larger when the connection is made with a bolt and the like with a larger force. However, if the connection is made with weaker force, a connection reliability between the external terminal and the external terminal bus bar is decreased.

The present invention provides a secondary cell module in which a transmission of a stress generated by torque when the external terminal connection portion is connected to the external terminal is suppressed, therefore, connection strength between the external terminal connection portion and the external terminal can be increased; and thus, the secondary cell module of improved reliability can be realized.

To solve the above described problem, the present invention has the following structure: a secondary cell module including: a plurality of secondary unit cells, each having a pair of a positive terminal and a negative terminal; a first bus bar which electrically connects the positive terminal of one unit cell with the negative terminal of another secondary cell among the secondary unit cells; a second bus bar, which is set at least two of the unit cells, electrically connecting with an external terminal; in which the first bus bar and the second bus bar are electrically connected with a voltage detection terminal, which detects a voltage of each of the secondary unit cells.

The present invention further has the structure as: the second bus bar includes: a first metal component, which connects with the positive terminal or the negative terminal; a second metal component, which connects with the external terminal; a third metal component, which connects with the voltage detection terminal; a first linkage portion, which connects the first metal component with the second metal component; a second linkage portion, which connects the first metal component with the third metal component; in which the first connection component and the second connection component are connected to each other by the first metal component; in which each of the first linkage portion and the second linkage portion extends differently from a same side of the first metal component, and the second metal component has an external terminal rotation stopper, which bends upward, to suppress a rotation of the external terminal.

Accordingly, the present invention can provide a secondary cell module in which a transmission of a stress generated by torque when the external terminal connection portion is connected to the external terminal is suppressed, thus, connection strength between the external terminal connection portion and the external terminal can be increased; and thus, the secondary cell module of improved reliability can be realized.

Purposes, structures and effects other than the one described above are disclosed in explanations in embodiments.

DETAILED DESCRIPTION OF THE PREFERRED EMBODIMENTS

Embodiments of the present invention are described referring to drawings. The same notation is added to essentially the same or the similar structures. Redundant explanations may be omitted.

Figure 1:
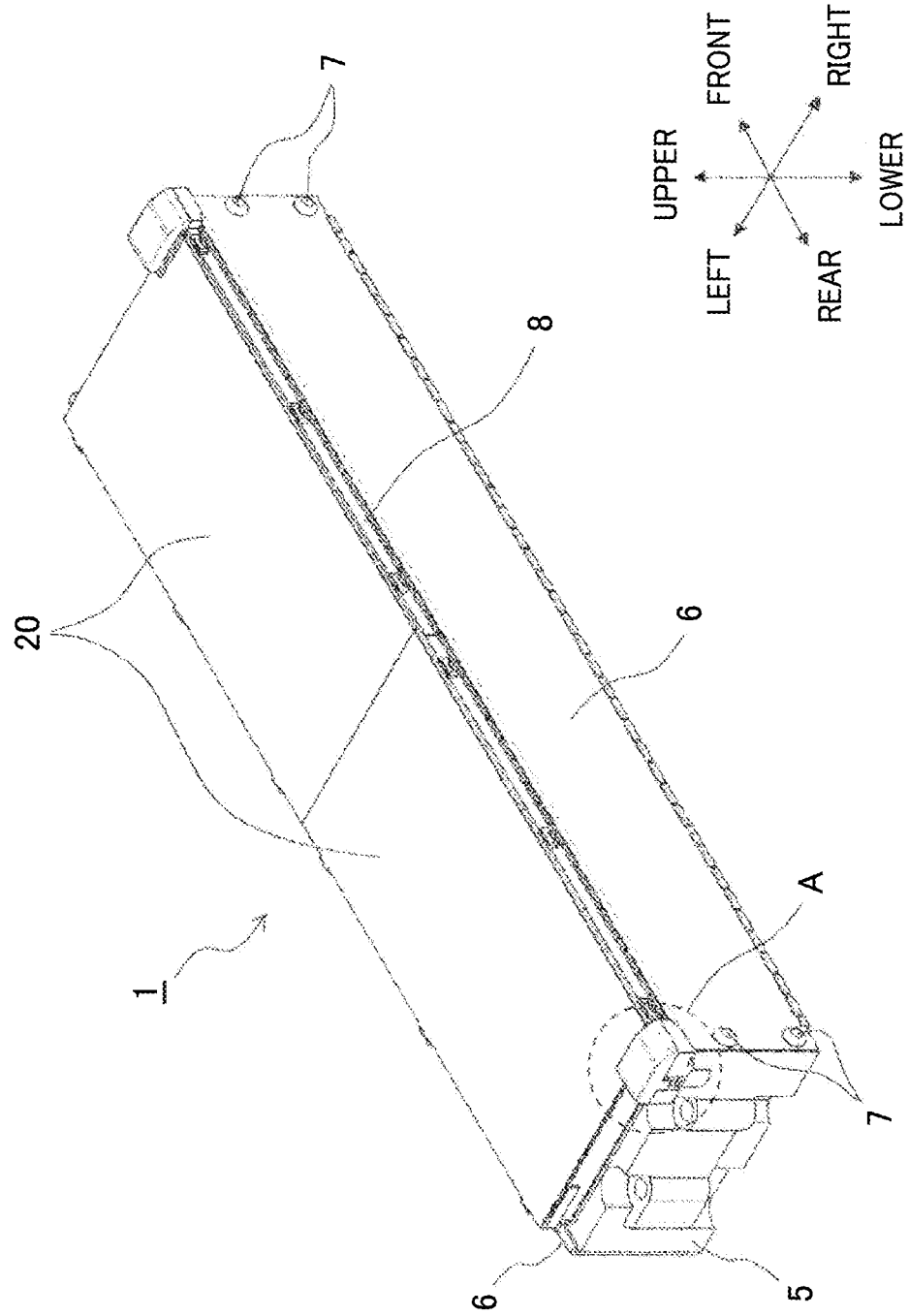
FIG. 1 is a perspective view of an outer structure of a secondary cell module according to embodiment 1.
Figure 2:
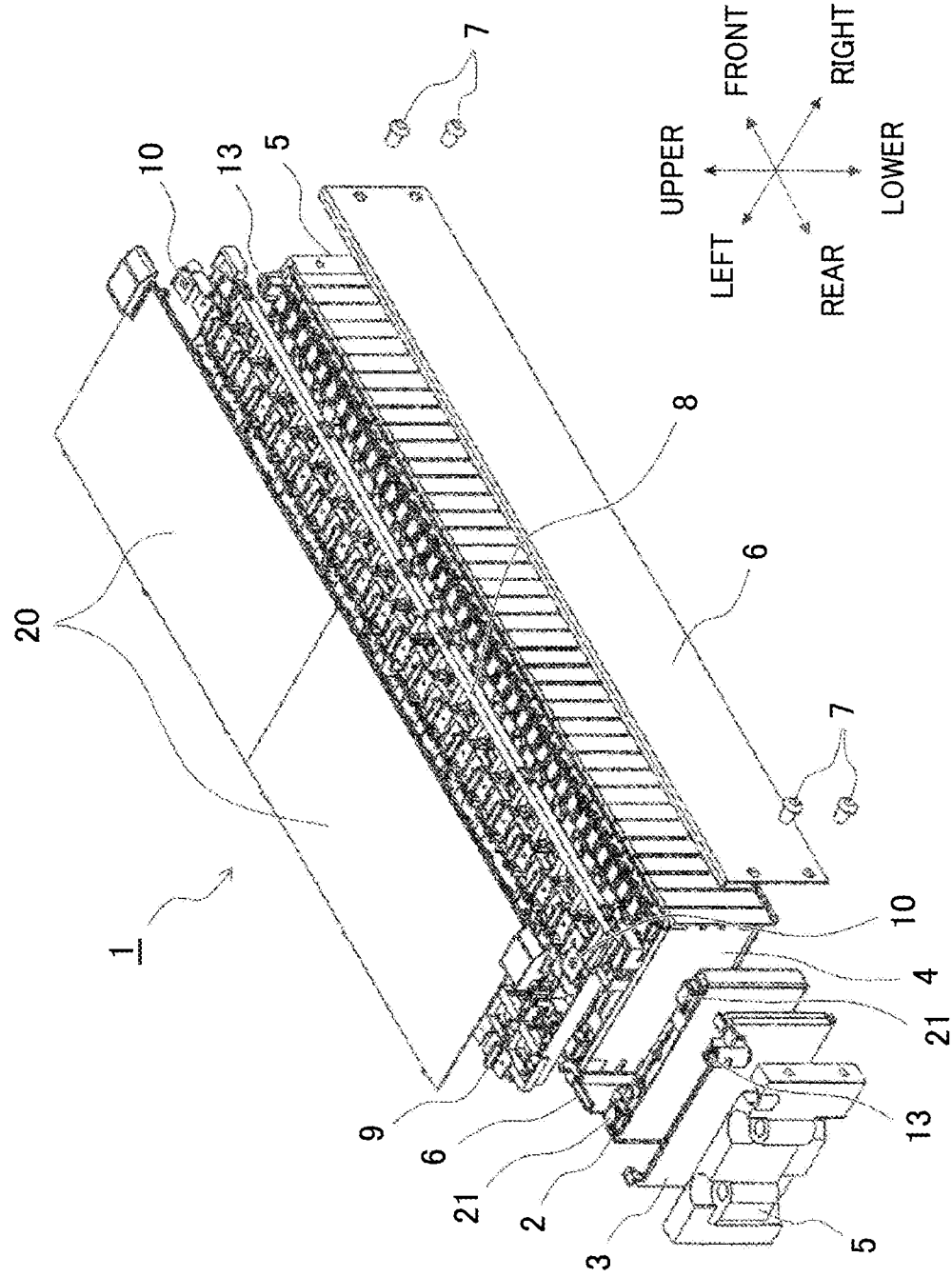
FIG. 2 is an exploded perspective view in which a part of the secondary cell module is disassembled according to embodiment 1.

In the embodiments, the terms of upper, lower, left, right, front or rear mean the same direction as depicted at the lower right positions of FIG. 1 and FIG. 2.

Embodiment 1

At the outset, an outer structure of a secondary cell module 1 according to embodiment 1 is explained.

FIG. 1 is a perspective view to explain the external appearance of the secondary cell module 1 according to embodiment 1.

The secondary cell module 1 includes: a cell group including a plurality of unit cells 2; a pair of end plates 5 made of metal, which sandwich the cell group including a plurality of unit cells 2; a first bus bar (herein cell to cell bus bar) 9 formed from metals as aluminum, copper, or iron and the like, and electrical wirings disposed on upper part of the cell group; an insulation cover 8 formed from engineering plastics; a pair of side plates 6; fixing members 7 as bolts, screws, rivets and the like to connect the end plate 5 with a side plate 6; and a module cover 20 disposed over the insulation cover 8.

Next, the disassembled state of a part of the secondary cell module 1 according to embodiment 1 is explained.

FIG. 2 is a perspective view to explain the disassembled state of a part of the secondary cell module 1 according to embodiment 1.

The secondary cell module 1 includes: a cell group including a plurality of unit cells 2; a pair of end plates 5, the insulation cover 8 to which the cell to cell bus bar 9 and electrical wirings are disposed; a pair of side plates 6; fixing members to connect the end plate 5 with the side plate 6; the module cover 20 disposed over the insulation cover 8.

The cell group includes unit cell holders 4, each of which is disposed between unit cells 2. The end plates 5, which are disposed at the end cells in the arranging direction of the unit cells 2. On the other hand, the side plates 6 are set along the both ends in width direction of the plurality of unit cells 2 (side surfaces), and are disposed from one end to another end in arranging direction of the unit cells 2; the side plates 6 are fixed to the pair of the end plates 5. The fixing members 7, which are e.g. bolts, screws, or rivets and the like, fix a pair of the end plates 5 and a pair of the side plates 6.

The insulation cover 8 is disposed to cover the electrode terminal 21 at the upper portion of the unit cell 2 in height direction. The cell to cell bus bar 9 mutually electrically connects the unit cells 21; the insulation cover 8 surrounds the cell to cell bar 9. The unit cell 2 and the cell to cell bus bar are connected to each other by e.g. bolts or welding.

The cell to cell bus bar 9 connects the positive terminal (negative terminal) 21 of one unit cell 2 with the negative terminal (positive terminal) of adjacent unit cell 2. That is to say, the cell to cell bus bar 9 has an unit cell connecting portion to connect with the positive or negative electrode terminal 21 of the unit cell 2. The cell to cell bus bar 9 further has a voltage detection terminal connection portion to connect with the voltage detection terminal. As described above, the cell to cell bus bar 9 has the unit cell connection portion and the voltage detection terminal connection portion.

By the way, the voltage detection terminal electrically connects with the cell to cell bus bar 9 and the second bus bar (herein after external terminal bus bar) 10 to detect the voltage of the unit cell 2. The voltage detection terminal connects with a voltage detecting circuit (not depicted) to detect the voltage of the unit cell 2.

The unit cell 2 has a pair of electrode terminals (positive electrode and negative electrode) 21, the unit cell holder 4 is set between each of the unit cells. The end holder 3 is disposed between the end plate 5 and one of the unit cells 2 at the end. The module cover 20 is disposed on the end holder 3; the fixing portion 13 is disposed to the end holder 3 to fix the second metal member (herein after external terminal connection portion) 15 (see FIG. 3). That is to say, the external terminal connection portion 15 is disposed at the upper part of the fixing portion 13 and is fixed to the fixing portion 13 with the external terminal.

The insulation cover 8 is disposed between the module cover 20 and the cell group; the external terminal bus bar 10 formed from metals as aluminum, copper, iron and the like is disposed at each end of the insulation cover 8 to form a connection portion to input or output power between one secondary cell module 1 and another secondary cell module 1 or between one secondary cell module 1 and an external entity. An external terminal is connected to the external terminal bus bar 10.

The external terminal means e.g. a terminal of the secondary cell module 1 to input or output power between another secondary cell module 1 or between an outer entity. The external terminal is connected to the outer terminal connection portion 15 of the external terminal bus bar 10 disposed to the secondary cell module 1.

Next, the enlarged structure in the vicinity of the external terminal bus bar 10 according to embodiment 1 is explained.

Figure 3:
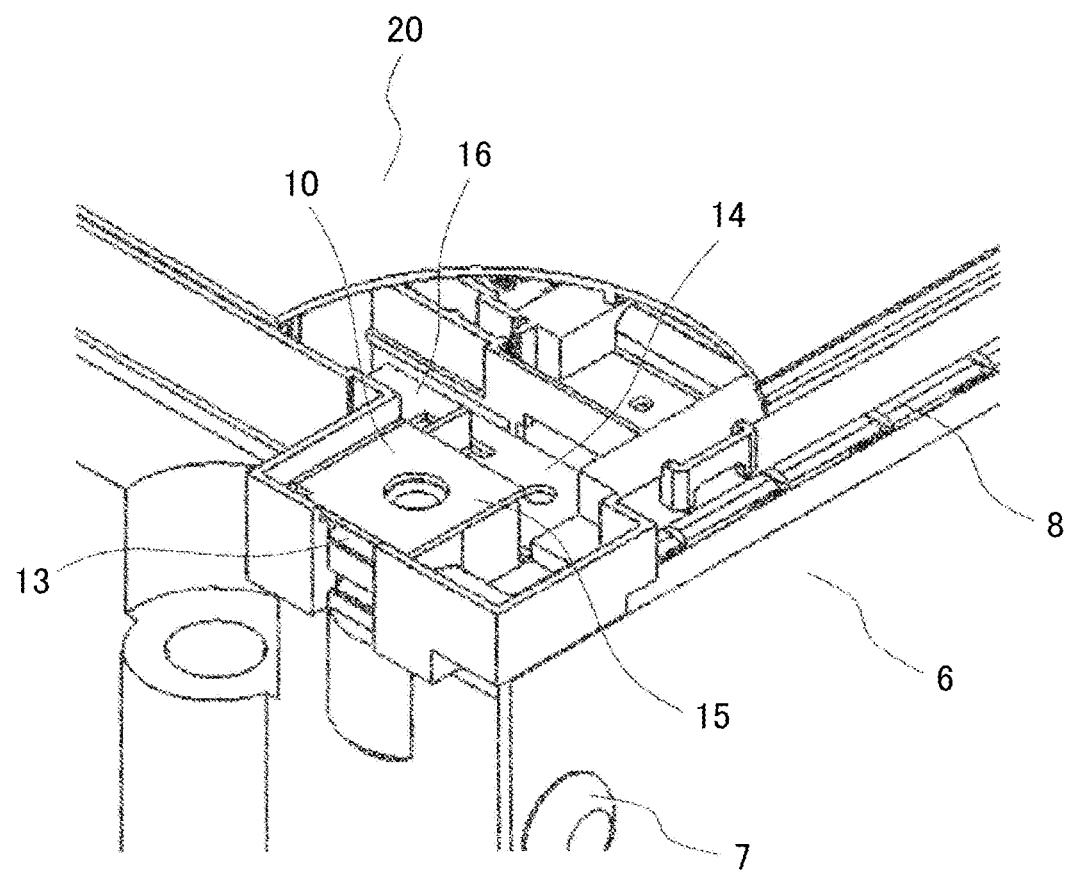
FIG. 3 is an enlarged perspective view of an external terminal bus bar and its vicinity.

FIG. 3 is a perspective view of the structure in the vicinity of the external terminal bus bar 10 according to embodiment 1.

In the meantime, FIG. 3 is an enlarged view of the portion A (surrounded by dotted line) in FIG. 1; in FIG. 3, the module cover 20 is removed and the external terminal bus bar 10 is seen from inclined direction.

The external terminal bus bar 10 has a first metal portion (herein after unit cell connection portion) 14, which connects to the positive or negative electrode terminal 21 of the unit cell 2, the external terminal connection portion 15, which connects with an external terminal, and the third metal portion (herein after voltage detection terminal connection portion) 16, which connects with the voltage detection terminal (e.g. a harness). The external terminal connection portion 15 is fixed to the fixing portion 13.

The positive or negative electrode terminal 21 of either one of the unit cells 2 at the end (end unit cell herein after) is connected to the unit cell connection portion 14.

Next, the external terminal bus bar 10 according to embodiment 1 is explained.

Figure 4:
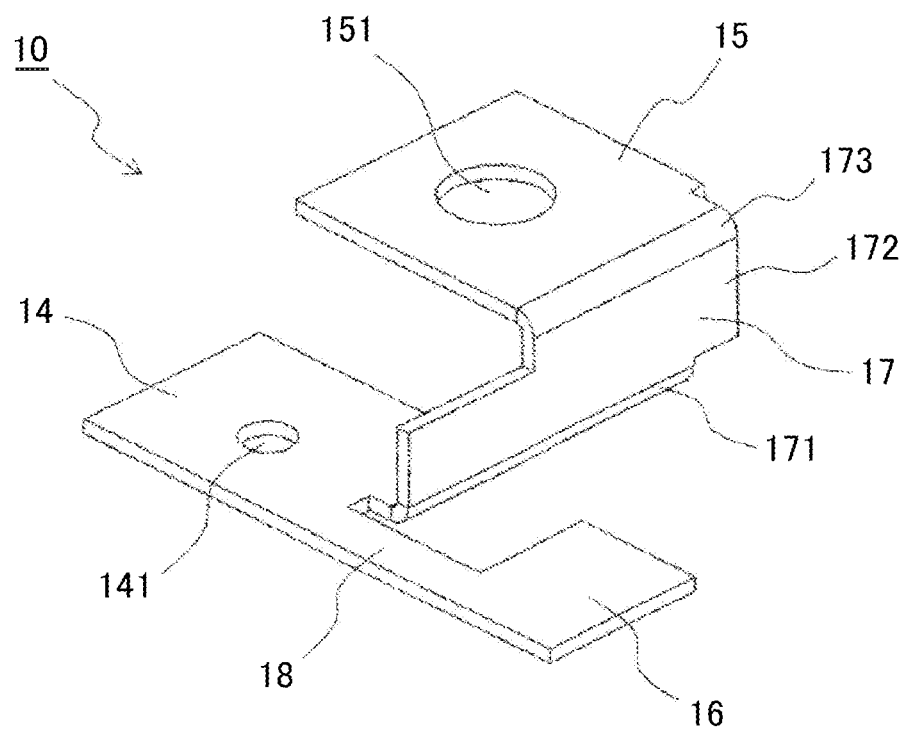
FIG. 4 is a perspective view of the external terminal bus bar 10 according to embodiment 1.

FIG. 4 is a perspective view of the external terminal bus bar 10 according to embodiment 1.

The external bus bar 10 includes the unit cell connection portion 14, which connects to the positive or negative electrode terminal 21 of the unit cell 2, the external terminal connection portion 15, which connects with an external terminal, the voltage detection terminal connection portion 16, which connects with the voltage detection terminal.

The screw fastening hole 141 is formed in the unit cell connection portion 14 to dispose the electrode terminal 21; and the screw fastening hole 151 is formed in the external terminal connection portion 15 to dispose the external terminal.

The first linkage member (herein after first linkage portion) 17 is formed between the unit cell connection portion 14 and the external terminal connection portion 15; the second linkage member (herein after second linkage portion) 18 is formed between the unit cell connection portion 14 and the voltage detection terminal connection portion 16.

The electrode terminal 21 of the unit cell 2 and the external terminal bus bar 10 are connected to each other by e.g. bolts or welding at the unit cell connection portion 14; the external terminal and the external terminal bus bar 10 are connected to each other by e.g. bolts at the external terminal connection portion 15; the voltage detection terminal and the external terminal bus bar 10 are connected to each other by e.g. welding at the voltage detection terminal connection portion 16.

The first linkage portion 17 electrically connects the unit cell connection portion 14 and the external terminal connection portion 15 to each other, and has a rising portion 172, which is raised from the unit cell connecting portion 14. The rising portion 172 includes the bending portion 171 bent from the rising portion 172 and connects to the unit cell connection portion 14, and the bending portion 173 bent from the rising portion 172 and connects to the external connection terminal connection portion 15.

The unit cell connection portion 14 and the external terminal connection portion 15 are formed with a step via the first connecting portion 17. That is to say, the unit cell connection portion 14 and the external terminal connection portion 15 are formed at different heights to each other.

The second linkage portion 18 electrically connects the unit cell connection portion 14 and the voltage detection terminal connection portion 16 in a plane shape. That is to say, the unit cell connection portion 14 and the voltage detection terminal connection portion 16 are disposed on the same height.

The structure of the first linkage portion 17 and the structure of the second linkage portion 18 are independent from each other. That is to say, the first linkage portion 17 and the second linkage portion 18 are not directly connected, but connected to each other via the unit cell connection portion 14. That is to say, each of the first linkage portion 17 and the second linkage portion 18 is connected to the unit cell connection portion 14 independently.

Each of the first linkage portion 17 and the second linkage portion 18 is formed extending from the same side of the unit cell connection portion 14.

The first linkage portion 17 and the second linkage portion 18 are formed from the same metal (e.g. aluminum or copper or the like) as the unit cell connection portion 14, the external terminal connection portion 15 and the voltage detection terminal connection portion 16. That is to say, the unit cell connection portion 14, external terminal connection portion 15, the voltage detection terminal connection portion 16, the first linkage portion 17 and the second linkage portion 18 of the external terminal bus bar 10 of embodiment 1 are all formed from the same metal.

As described above, the secondary cell module 1 according to embodiment 1 includes a plurality of unit cells 2, each of the cells has a pair of positive electrode 21 and the negative electrode 21; the cell to cell bus bar 9, which electrically connects a positive electrode 21 of one unit cell 2 and a negative electrode 21 of adjacent another unit cell 2 among the plurality of unit cells 2; and the external terminal bus bar 10, which is disposed to two unit cells 2 among the plurality of unit cells 2 to electrically connect to an external terminal.

The cell to cell bus bar 9 and the external terminal bus bar 10 are electrically connected to the voltage detection terminal to detect a voltage of the unit cell 2, and the voltage detecting terminal is connected to the voltage detecting circuit.

The external terminal bus bar 10 has: the unit cell connection portion 14, which connects (is fixed) to the positive terminal or negative terminal 21 of the unit cells 2, the external terminal connection portion 15, which connects (is fixed) to the external terminal, the voltage detection terminal connection portion 16, which connects (is fixed) to the voltage detecting terminal, the first linkage portion 17, which connects (links) the unit cell connecting portion 14 and the external terminal connecting portion 15, the second linkage portion 18, which connects (links) the unit cell connecting portion 14 and the voltage detection terminal connecting portion 16; and the first linkage portion 17 and the second linkage portion 18 are connected via the unit cell connection portion 14.

According to the above structure, in the secondary cell module 1 according to embodiment 1, the stress, generated by torque when the external terminal is connected to the external terminal connection portion 15, is not directly transmitted to the voltage detection terminal 16 because the external terminal connection portion 15 is connected to the voltage detection terminal connection portion 16 via the first linkage portion 17, the unit cell connecting portion 14 and the second linkage portion 18.

Since a transmission of the stress, generated when the external terminal is connected to the external connection portion 15, to the voltage detection terminal connection portion 16 can be suppressed, the connecting force between the external terminal connecting portion 15 and external terminal can be made larger, thus, a reliability of the cell module can be improved.

Embodiment 2

Next, the external terminal bus bar 10 according to embodiment 2 is explained.

Figure 5:
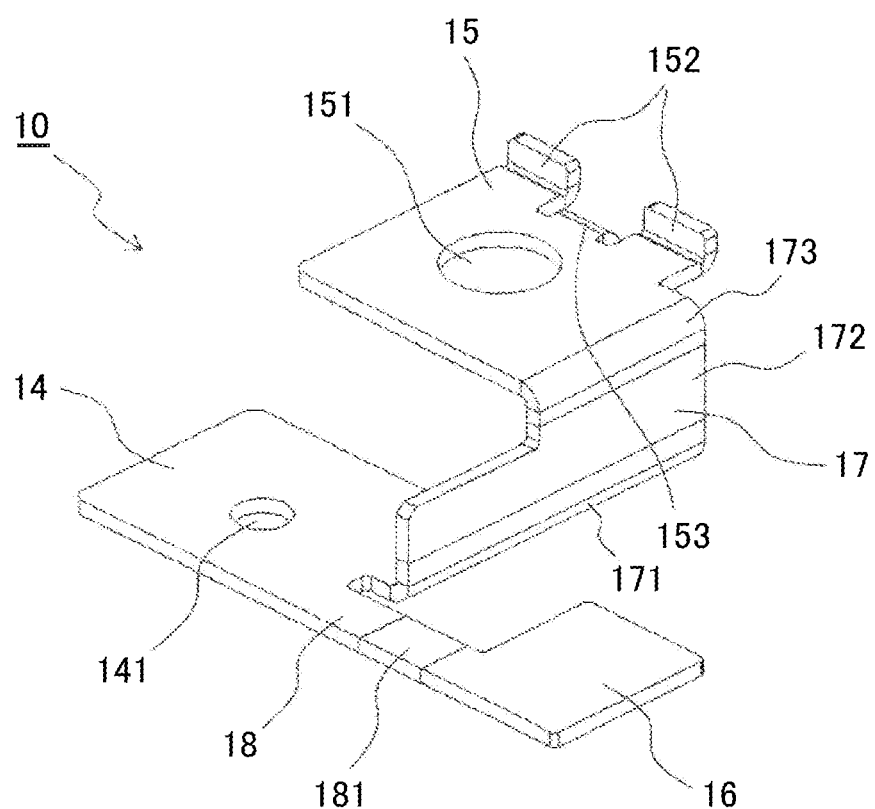
FIG. 5 is a perspective view of an external terminal bus bar 10 according to embodiment 2.

FIG. 5 is a perspective view of the external terminal bus bar 10 according to embodiment 2.

Comparing with the external terminal bus bar 10 according to embodiment 1, the external terminal connection portion 15 of the external terminal bus bar 10 according to embodiment 2 has the external terminal rotation stopper 152, which suppresses a rotation of the external terminal, and the external terminal bus bar rotation stopper 153, which suppresses a rotation of the external terminal bus bar 10.

In embodiment 2, the external terminal rotation stopper 152 is formed as bent upward with respect to the external connection portion 15. Consequently, the external terminal contacts the external terminal rotation stopper 152, thus, the rotation of the external terminal is suppressed. Specifically, when the external terminal is rectangle, one side of the external terminal contacts the external terminal rotation stopper 152, thus, the rotation is effectively suppressed.

In embodiment 2, the external terminal bus bar rotation stopper 153 is formed as bent downward with respect to the external connection portion 15. The external terminal bus bar rotation stopper 153, which bent downward, fits to the fitting portion 191 formed at the external terminal setting portion 19. Thus, a rotation of the external terminal bus bar 10 is suppressed, and the external terminal bus bar 10 is fixed.

In embodiment 2, the external terminal rotation stopper 152 is formed as bent upward and the external terminal bus bar rotation stopper 153 is formed as bent downward; however, the external terminal rotation stopper 152 can be formed as bent downward and the external terminal bus bar rotation stopper 153 can be formed as bent upward.

In other words, the external terminal bus bar 10 has a portion that extends toward the direction to the fixing portion 13 (downward) from the external terminal connection portion (connecting portion with the external terminal) 15 and another portion that extends to the reverse direction to the fixing portion 13 (upward).

Further, the unit cell connection portion 14, the external terminal connection portion 15 and the voltage detection terminal connection portion 16 can be formed by different metals from each other. Alternatively, the unit cell connection portion 14 and the external terminal connection portion 15 can be formed by different metals from each other, or the unit cell connection portion 14 and the voltage detection terminal connection portion 16 can be formed by different metals from each other.

In the external terminal bus bar 10 according to embodiment 2, for example, the unit cell connection portion 14 is made of aluminum, the external terminal connection portion 15 is made of copper and the voltage detection terminal connection portion 16 is made of copper.

A joint portions, which join different metals together, are formed between the unit cell connection portion 14 and the external terminal connection portion 15 and between the unit cell connection portion 14 and the voltage detection terminal connection portion 16. The joint portion consists of a structure that different metals are joined together, and for example, a clad material is used.

Thus, a connecting resistances between the unit cell 2 and the electrode terminal 21, between the unit cell 2 and the external terminal, and between the unit cell 2 and the voltage detection terminal can be decreased; consequently an efficient secondary cell module 1 can be provided.

This joint portion is preferably formed in a plane. For example, the joint portion between the unit cell connection portion 14 and the external terminal connection portion 15 is formed at uprising portion 172 of the first linkage portion 17; the joint portion between the unit cell connection portion 14 and the voltage detection terminal connection portion 16 is formed at a part of the plane 181 of the second linkage portion 18.

That is to say, in the external terminal bus bar 10 described in embodiment 2, the unit cell connection portion 14, the external terminal connection portion 15 and the voltage detection terminal connection portion 16 are formed by different metals; the interfaces at which the different metals join together are disposed at the plane area of the first linkage portion 17 and the plane area of the second linkage portion 18.

Thus, electrical reliability between the unit cell connection portion 14 and the external terminal connection portion 15, and between the unit cell connection portion 14 and the voltage detection terminal connection portion 16 are improved.

Next, the external terminal bus bar 10 and the end holder 3 according to embodiment 2 are explained.

Figure 6:
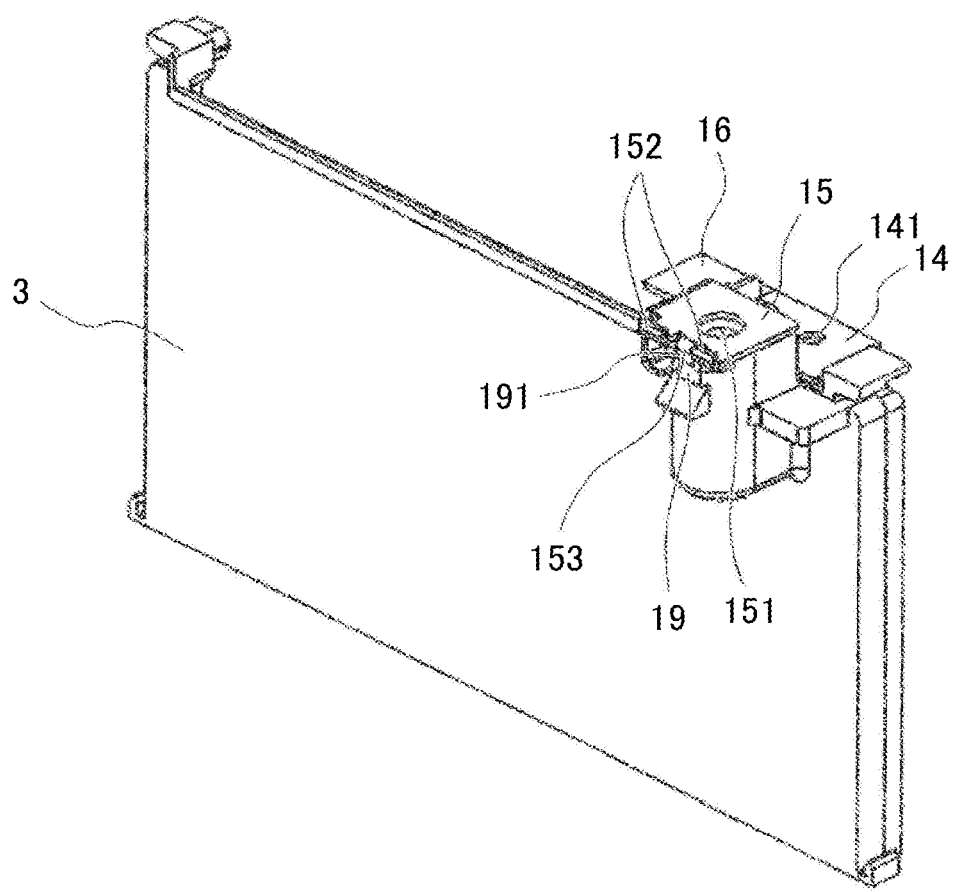
FIG. 6 is a perspective view of the external terminal bus bar 10 and an end holder 3 according to embodiment 2.

FIG. 6 is a perspective view of the external terminal bus bar 10 and the end holder 3 according to embodiment 2.

The external terminal setting portion 19 to dispose the external terminal bus bar 10 is formed at the end holder 3. The fitting portion 191, to which the external terminal bus bar rotation stopper 153 is fit, is formed at the external terminal setting portion 19.

That is to say, the external terminal bus bar rotation stopper 153, which bent downward with respect to the external terminal connection portion 15, fits to the fitting portion 191 formed at the external terminal setting portion 19. Thus, a rotation of the external terminal bus bar 10 is suppressed.

Thus, the stress caused by torque when the external terminal is connected to the external terminal connection portion 15 can be decreased by suppressing a rotation of the external terminal and suppressing a rotation of the external terminal bus bar 10; consequently, a secondary cell module 1 of high reliability can be provided.

Embodiment 3

Next, the external terminal bus bar 10 according to embodiment 3 is explained.

Figure 7:
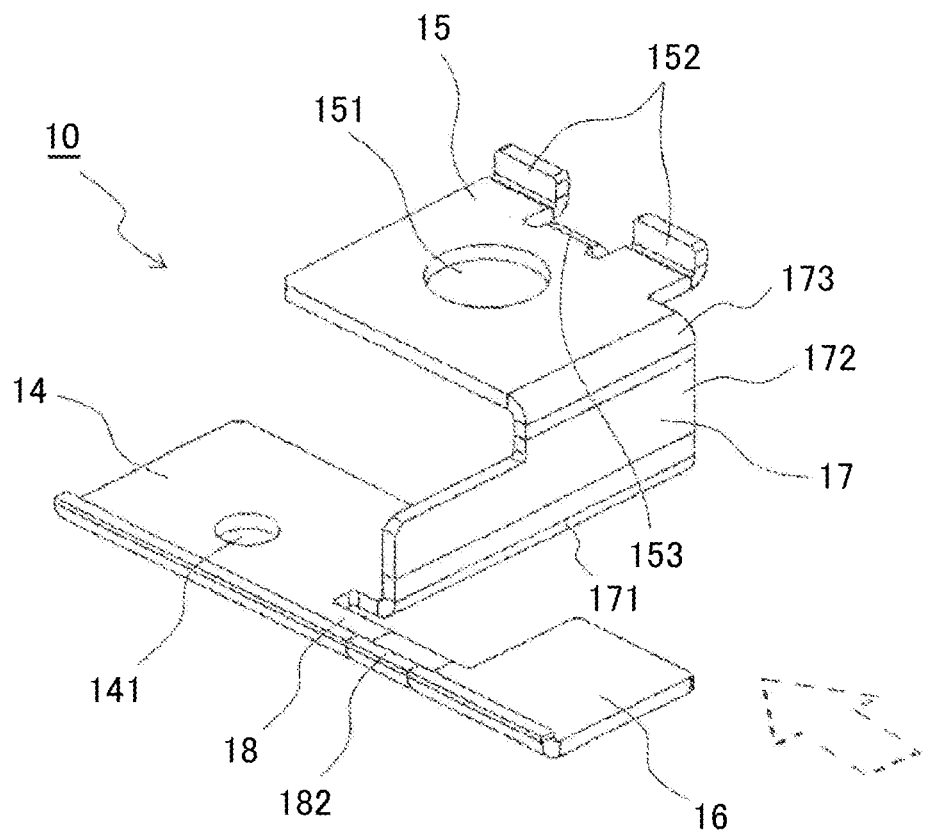
FIG. 7 is a perspective view of an external terminal bus bar 10 according to embodiment 3.
Figure 8:
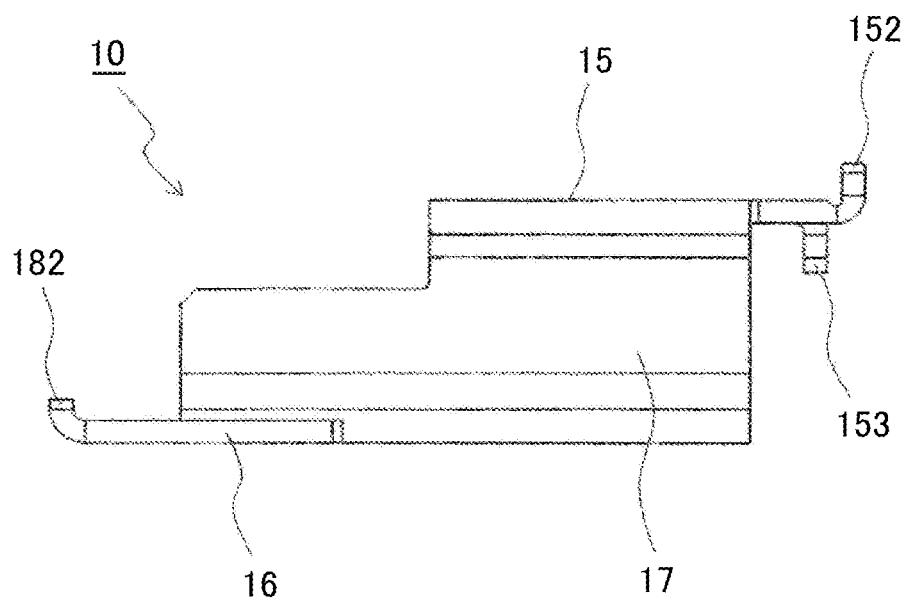
FIG. 8 is a side view of the external terminal bus bar 10 according to embodiment 3.

FIG. 7 is a perspective view, which explains the external terminal bus bar 10 according to embodiment 3; FIG. 8 is a side view (viewed from the direction of dotted arrow in FIG. 7), which explains the external terminal bus bar 10 according to embodiment 3.

Comparing with the external terminal bus bar 10 according to embodiment 2, the second linkage portion 18 of the external terminal bus bar 10 according to embodiment 3 has a bent edge portion 182 (element), which bends perpendicularly upward or downward with respect to the second linkage portion 18.

By the way, in the external terminal bus bar 10 described in embodiment 3, the bent edge portion 182 is formed along the unit cell connection portion 14, the second linkage portion 18, and the voltage detection terminal connection portion 16. That is to say, edge portions from the unit cell connection portion 14 through the voltage detection terminal connection portion 16 has the bent edge portion 182, which is bent perpendicularly upward or downward. Consequently, the strength of the second linkage portion 18 is improved. In embodiment 3, bent edge portion 182 is bent perpendicularly upward.

Embodiment 4

Next, the external terminal bus bar 10 according to embodiment 4 is explained.

Figure 9:
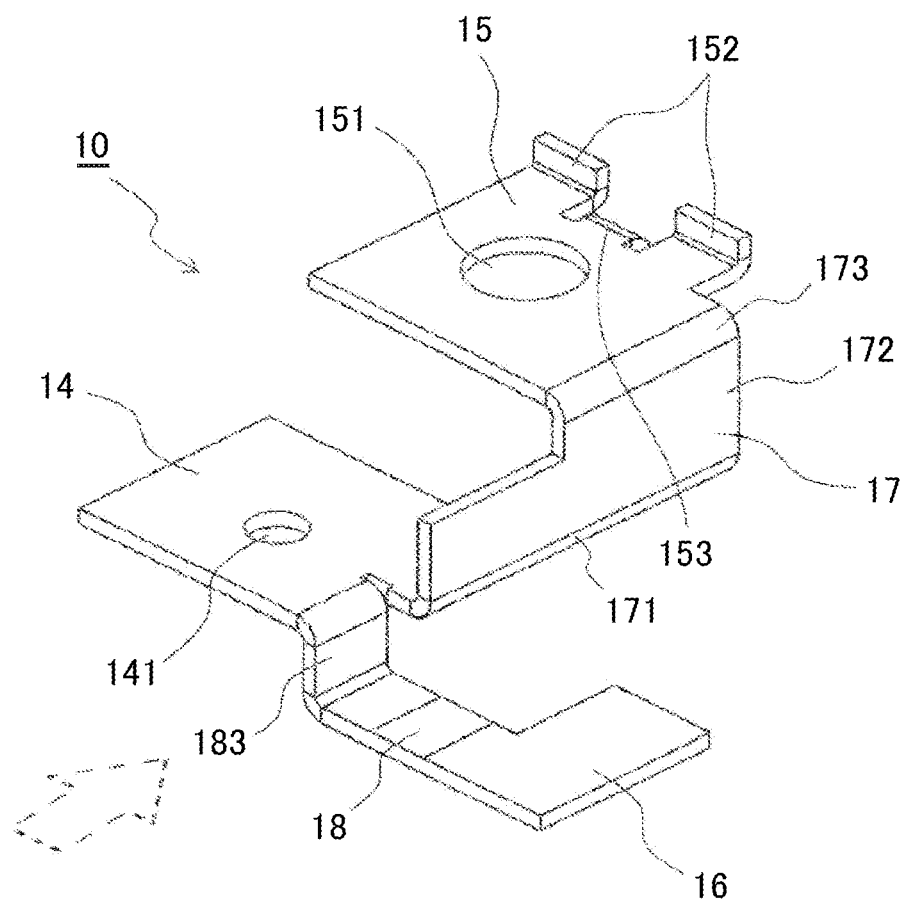
FIG. 9 is a perspective view of an external terminal bus bar 10 according to embodiment 4.
Figure 10:
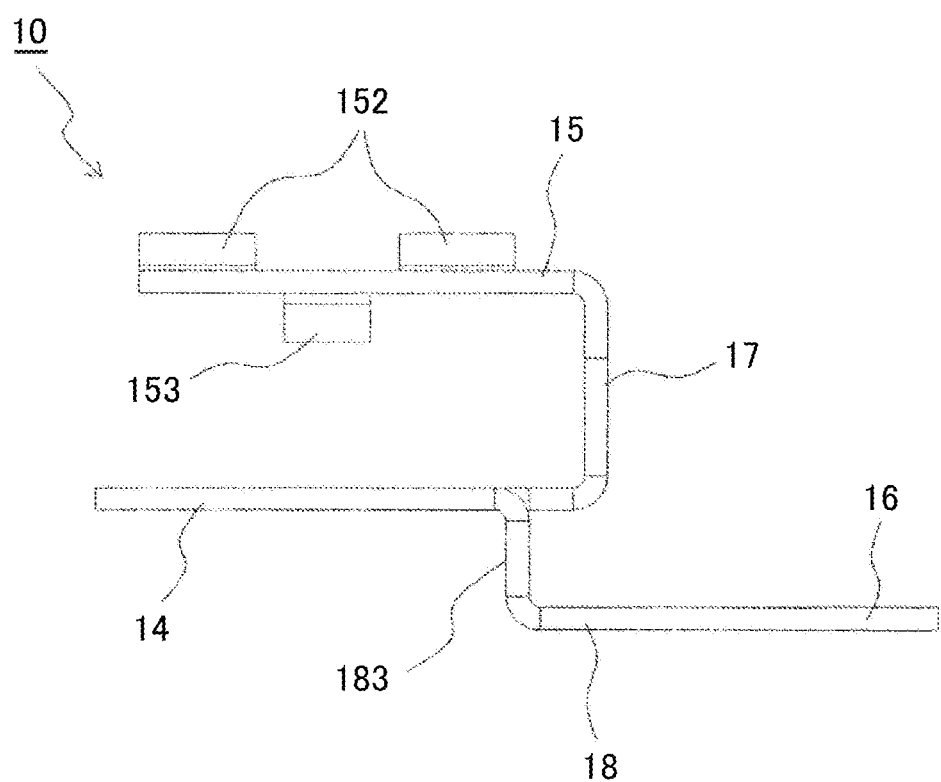
FIG. 10 is a front view of the external terminal bus bar 10 according to embodiment 4.

FIG. 9 is a perspective view, which explains the external terminal bus bar 10 according to embodiment 4; FIG. 10 is a front view (viewed from the direction of dotted arrow in FIG. 9), which explains the external terminal bus bar 10 according to embodiment 4.

Comparing with the external terminal bus bar 10 according to embodiment 2, the second linkage portion 18 of the external terminal bus bar 10 according to embodiment 4 has the rising component 183, which formed perpendicularly upward or downward with respect to the unit cell connection portion 14; the unit cell connection portion 14 and the voltage detection terminal connection portion 16 are connected to each other through the second connecting portion 18, which has the rising component 183.

By the way, the rising component 183 is formed perpendicularly downward in the external terminal bus bar 10 described in embodiment 4. That is to say, each of the unit cell connection portion 14, the external terminal connection portion 15 and the voltage detection terminal connection portion 16 is formed at different height. In other words, the disposing position of the unit cell connection portion 14, the disposing position of the external terminal connection portion 15 and the disposing position of the voltage detection terminal connection portion 16 are all different to each other. Therefore, design freedom is improved.

In the meantime, the present invention is not limited to the embodiment described above; the present invention includes various modifications. The embodiments are for easy understanding of the present invention; however, the present invention is not necessarily limited to the structure having all the elements of the embodiments. For example, one structure of one embodiment can be substituted by another structure of another embodiment; one structure of one embodiment can be added to the structure of another embodiment. Further, a part of a structure of one embodiment can be added to a part of a structure of another embodiment; a part of a structure of one embodiment can substitute a part of a structure of another embodiment; a part of the structure of the embodiment can be eliminated.

What is claimed is:

1. A secondary cell module comprising:
a plurality of secondary unit cells, each having a pair of a positive terminal and a negative terminal,
a first bus bar which electrically connects the positive terminal of one unit cell with the negative terminal of another secondary cell among the secondary unit cells, and a second bus bar, which is disposed to at least two of the unit cells, electrically connecting with an external terminal,
wherein the first bus bar and the second bus bar are electrically connected with a voltage detection terminal, which detects a voltage of each of the secondary unit cells,
the second bus bar includes:
a first metal component, which connects with the positive terminal or the negative terminal,
a second metal component, which connects with the external terminal,
a third metal component, which connects with the voltage detection terminal,
a first linkage portion, which connects the first metal component and the second metal component, and
a second linkage portion, which connects the first metal component with the third metal component,
wherein the first linkage portion and the second linkage portion are connected to each other by the first metal component,
wherein each of the first linkage portion and the second linkage portion extends differently from a same side of the first metal component, and
wherein the second metal component has a pair of external terminal rotation stoppers, both of which project from a same side surface of the second metal component at opposite ends of the same side surface and bend upward to suppress a rotation of the external terminal, and the second metal component has an external terminal bus bar rotation stopper, which is disposed between the pair of external terminal rotation stoppers, projects from the same side surface and bends downward to fix the second bus bar.

2. The secondary cell module according to claim 1, wherein the first metal component, the second metal component, the third metal component, the first linkage portion, and the second linkage portion of the second bus bar are formed from a same metal.

3. The secondary cell module according to claim 1, wherein, the first metal component, the second metal component and the third metal component are formed from different metals, and
each of the first linkage portion and the second linkage portion is formed in a plane area.

4. The secondary cell module according to claim 1, wherein, a bent component, which bends upward or downward, is formed from an edge of the first metal component to an edge of the third metal component.

5. The secondary cell module according to claim 1, wherein, the first metal component, the second metal component and the third metal component are disposed on different planes.

6. A secondary cell module comprising:
a plurality of secondary unit cells, each having a pair of a positive terminal and a negative terminal,
a first bus bar which electrically connects the positive terminal of one unit cell with the negative terminal of another secondary cell among the secondary unit cells, and a second bus bar, which is disposed to at least two of the unit cells, electrically connecting with an external terminal,
wherein the first bus bar and the second bus bar are electrically connected with a voltage detection terminal, which detects a voltage of each of the secondary unit cells, the second bus bar includes:

a first metal component, which connects with the positive terminal or the negative terminal, a second metal component, which connects with the external terminal, a third metal component, which connects with the voltage detection terminal, a first linkage portion, which connects the first metal component and the second metal component, and a second linkage portion, which connects the first metal component with the third metal component, wherein the first linkage portion and the second linkage portion are connected to each other by the first metal component, wherein each of the first linkage portion and the second linkage portion extends differently from a same side of the first metal component, wherein the second metal component has an external terminal rotation stopper, which bends upward, to suppress a rotation of the external terminal, and wherein the first metal component and the third metal component lie in a same plane.

7. The secondary cell module according to claim 6, wherein the second linkage portion lies in the same plane as the first metal component and the third metal component.

8. The secondary cell module according to claim 1, wherein the first metal component and the second metal component lie in different planes that are parallel to each other.

9. The secondary cell module according to claim 8, wherein the first linkage portion is disposed in a plane perpendicular to the different planes in which the first metal component and the second metal component lie.

* * * * *